US012311333B2

(12) United States Patent
Coscia et al.

(10) Patent No.: US 12,311,333 B2
(45) Date of Patent: May 27, 2025

(54) REACTOR WITH CATALYST UNIT REPLACEABLE IN THE COURSE OF OPERATION AND PROCESS FOR REPLACING A CATALYST UNIT

(71) Applicant: L'Air Liquide, Société Anonyme pour l'Etude et l'Exploitation des Procédés Georges Claude, Paris (FR)

(72) Inventors: Antonio Coscia, Hadamar (DE); Dieter Ulber, Steinbach (DE); Jan Cobbaut, Brussels (BE); Michael De Pauw, Antwerp (BE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 628 days.

(21) Appl. No.: 17/672,367

(22) Filed: Feb. 15, 2022

(65) Prior Publication Data

US 2022/0258120 A1 Aug. 18, 2022

(30) Foreign Application Priority Data

Feb. 18, 2021 (EP) .................................. 21020080

(51) Int. Cl.
*B01J 19/00* (2006.01)
*B01D 53/86* (2006.01)
*B01D 53/88* (2006.01)

(52) U.S. Cl.
CPC ...... *B01J 19/0073* (2013.01); *B01D 53/8631* (2013.01); *B01D 53/885* (2013.01)

(58) Field of Classification Search
CPC ........ B01D 53/00; B01D 53/34; B01D 53/74; B01D 53/85; B01D 53/8621; B01D 53/8625; B01D 53/8631; B01D 53/92; B01D 53/94; B01D 53/9404; B01D 53/9409; B01J 8/00; B01J 8/008; B01J 8/0085; B01J 8/02; B01J 19/00; B01J 19/0053; B01J 19/0073; B01J 2208/00; B01J 2208/02
See application file for complete search history.

(56) References Cited

U.S. PATENT DOCUMENTS 5,071,629 A   12/1991  Fenger et al.

FOREIGN PATENT DOCUMENTS

CN        110585920        12/2019
WO        WO 01 10539       2/2001

OTHER PUBLICATIONS

European Search Report for corresponding EP 21020080, Jul. 27, 2021.

*Primary Examiner* — Natasha E Young
(74) *Attorney, Agent, or Firm* — Elwood L. Haynes

(57) ABSTRACT

The invention relates to a reactor, in particular a reactor for purifying offgases. The reactor includes a plurality of housing openings which open into a housing shaft, wherein the housing shafts are fitted with catalyst units. The reactor includes a sealing housing per housing shaft which allows replacement of the catalyst units in the course of ongoing operation of the reactor by way of a suitable arrangement of sealing elements and covering elements without there being any air exchange between an external environment of the reactor and the respective housing shaft.

11 Claims, 3 Drawing Sheets

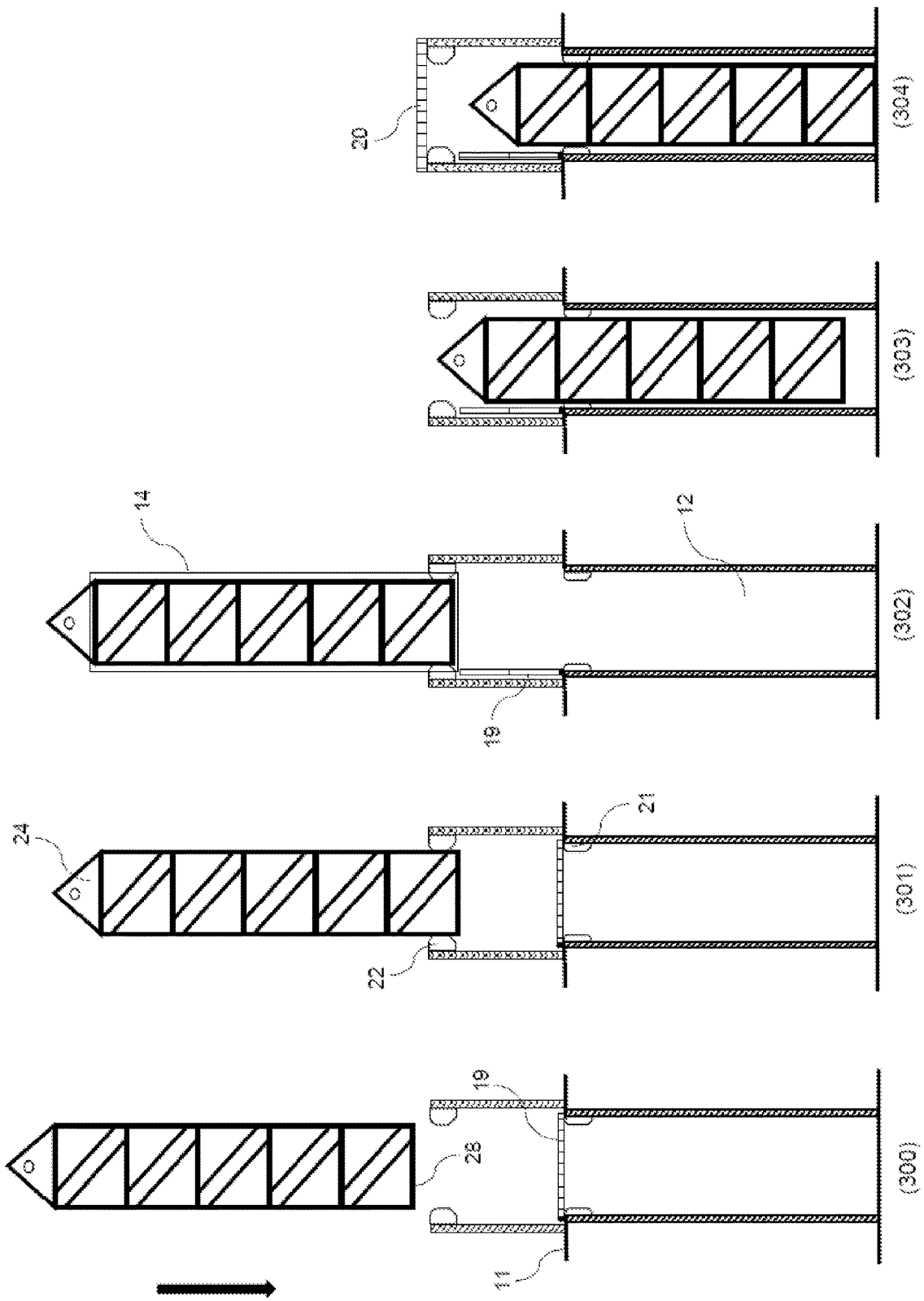

REACTOR WITH CATALYST UNIT REPLACEABLE IN THE COURSE OF OPERATION AND PROCESS FOR REPLACING A CATALYST UNIT

CROSS REFERENCE TO RELATED APPLICATIONS

This application claims the benefit of priority under 35 U.S.C. § 119 (a) and (b) to European Patent Application No. EP 210200804 filed Feb. 18, 2021, the entire contents of which are incorporated herein by reference.

TECHNICAL FIELD OF THE INVENTION

The invention relates to a reactor comprising a catalyst unit replaceable in the course of ongoing operation for interruption-free servicing of the reactor. The invention further relates to a process for withdrawing a catalyst unit from a reactor, to a process for inserting a catalyst unit into a reactor and to a process for replacing a catalyst unit of a reactor.

BACKGROUND

In the purification of offgases and flue gases in large industrial scale incineration plants, reformer furnaces or gas turbines a conversion of toxic gases present in the offgas or flue gas into non-toxic gases is carried out over more or less selective catalysts. A known example is the selective catalytic conversion of nitrogen oxides, NOx for short, into nitrogen using ammonia (comproportionation) over a transition metal oxide catalyst such as titanium dioxide. The process is also known as selective catalytic reduction (selective catalytic reduction—SCR) and the employed catalysts are accordingly referred to as SCR catalysts.

In practice these catalysts are installed in the so-called convection route inside a channel usually as catalyst modules one on top of another inside a lattice-like metal frame, for example a stacking frame. Servicing of the catalyst, i.e. cleaning or replacement of the catalyst, requires a plant shutdown. Servicing may become necessary for example due to a blockage of the catalyst by flue gas particles or with depletion of the catalyst which requires replacement of individual or all catalyst modules. Blockages may be caused by incombustible dust or foreign objects introduced by the fuel or the air. Especially in reformer furnaces, unexpected blockages result in a limiting of plant throughput or necessitate rescheduling of a planned servicing shutdown of the plant. An unexpected reduction in the catalyst activity may likewise force a plant shutdown since certain limits prescribed by law, such as NOx limits, can no longer be achieved.

The catalyst activity decreases constantly over time. Since the catalyst is only replaceable during a plant shutdown there is only a low probability that a catalyst will reach the end of its service life precisely when a servicing shutdown of the plant is planned. The operator of the plant is in this case forced to replace the catalyst, even though said catalyst might still have sufficient activity. This unnecessarily increases the operating costs (apex) of the plant. The periodicity of the servicing shutdowns depends on many factors, such as acceptance by a customer or an authority, tests prescribed by law or the activity of other catalysts installed in the plant, such as for example the activity of the nickel catalysts in the reformer tubes of a reformer furnace.

When planning a new plant the amount of installed catalyst must be sufficiently high to achieve the planned servicing cycle. A sufficiently large reactor and the greater amount of catalyst thus also unnecessarily increases capital costs (capex).

A greater amount of catalyst than actually required also results in a greater overall pressure drop over the offgas or flue gas purification unit. In the case of a steam reforming unit (production of synthesis gas from natural gas) the pressure drop over an SCR unit may account for up to 30% of the overall pressure drop of the offgas tract. Operation with a blocked SCR catalyst can even increase this value up to 70-80%. In known reactors replacing the catalyst module stack is only possible when the plant is taken out of operation. The catalyst units (catalyst module stack) are usually arranged inside the reactor housing in a shaft-like frame and are withdrawn by opening a cover, for example on the reactor top side, before the new catalyst unit is subsequently reinserted. Opening of the cover in the course of ongoing operation results either in offgas escape from the offgas channel or entry of false air into the offgas channel, depending on the particular pressure conditions. However, offgas or flue gas escaping from the flue gas channel is questionable from a safety engineering standpoint and can result in large system pressure fluctuations. Entry of false air can also lead to relatively large system pressure fluctuations. This means that the plant must in any case be shut down before opening the reactor housing; replacement during ongoing operation is thus not possible.

SUMMARY

It is an object of the present invention to at least partially overcome the aforementioned disadvantages of the prior art.

It is in particular an object of the present invention to propose a reactor which allows replacement of the catalyst independently of planned servicing cycles.

It is a further object of the present invention to propose a process which allows replacement of the catalyst independently of planned servicing cycles.

It is in particular an object of the present invention to propose a reactor and a process which allows replacement of the offgas catalyst in the course of ongoing operation.

The independent claims make a contribution to the at least partial achievement of at least one of the above objects. The dependent claims provide preferred embodiments which contribute to the at least partial achievement of at least one of the objects. Preferred embodiments of constituents of one category according to the invention are, where relevant, likewise preferred for identically named or corresponding constituents of a respective other category according to the invention.

The terms "having", "comprising" or "containing", etc., do not preclude the possible presence of further elements, ingredients, etc. The indefinite article "a" does not preclude the possible presence of a plurality.

The achievement of at least one of the abovementioned objects is at least partially effected by a reactor, in particular a reactor for purifying offgases, comprising a housing comprising at least one housing opening which opens into a housing shaft;

a catalyst unit arranged inside the housing shaft, movable inside the housing shaft and withdrawable from the housing shaft, wherein the catalyst unit comprises one or more catalyst modules;

a sealing housing encasing the housing opening having a first side and a second side, wherein the sealing housing comprises a first opening arranged in the region of the housing opening on the first side and a second opening arranged on the second side;

a first movable covering element arranged in the region of the housing opening and the first opening of the sealing housing which in the closed state covers the housing opening;

a second movable covering element arranged in the region of the second opening of the sealing housing which in the closed state covers the second opening of the sealing housing;

a first sealing element arranged in the region of the housing opening and the first opening of the sealing housing;

a second sealing element arranged in the region of the second opening of the sealing housing;

an extension module which is arranged at a first end of the catalyst unit and is connected to a catalyst module and extends through the housing opening and at least partially through the sealing housing.

The reactor according to the invention allows replacement of catalyst units in the course of ongoing operation. Replacement in the course of ongoing operation may also be referred to as online replacement.

The present invention provides a sealing housing which encases the opening of the reactor housing. The sealing housing has two openings. In one example the first opening is a lower opening and the second opening is an upper opening when the replacing of the catalyst units is effected from a top side of the reactor. The sealing housing is for example round or cuboidal or tubular, wherein two opposite sides of the tube or the cuboid comprise the two openings. In the region of the first opening of the sealing housing which preferably encases the housing opening of the reactor a first sealing element and a first movable covering element are provided. In the region of the second opening of the sealing housing which is arranged for example at the other end of the sealing housing relative to the first opening a second sealing element and a second movable covering element are provided. The arrangement according to the invention of the covering elements and of the sealing elements allows opening, withdrawal and reinsertion of a catalyst unit in such a way that despite an open reactor no entry of false air and no escape of offgas can occur during the entire replacement operation.

The reactor according to the invention further comprises an extension module arranged at a first end of the catalyst unit. The extension module forms part of the catalyst unit. A catalyst unit thus comprises one or more catalyst modules and at least one extension module. The extension module extends through the housing opening and projects at least partially into the sealing housing and thus spatially extends at least partially through the sealing housing. The extension module serves for example for accommodation by a withdrawal apparatus, for example a crane. In operation the extension module may be arranged only partially, if at all, inside the portion of the housing shaft through which offgases flow. In one example the extension module is therefore not filled with catalyst.

The reactor generally comprises a multiplicity of housing shafts arranged in series and/or in parallel in the flow direction of the offgas stream, wherein each housing shaft accommodates a catalyst unit. In one example the reactor thus comprises a plurality of catalyst units. Accordingly a dedicated sealing housing is provided for each of the housing shafts and catalyst units. This ensures that despite a missing catalyst unit the offgas purification continues to operate properly during replacement of a catalyst unit in the course of continuing operation.

The individual catalysts units may have different dimensions. In one example a first catalyst unit in the flow direction of the offgas stream has a shorter flow path length than a subsequent catalyst unit in the flow direction of the offgas stream. If blockages occur in a catalyst unit this often affects the first catalyst unit in the flow direction of the offgas stream. It is then advantageous if in the case of a blockage and possible resulting deactivation of a catalyst unit the smaller catalyst unit, in this case the first catalyst unit in the flow direction of the offgas stream, requires replacement.

The reactor is configured for purification of offgases. According to the invention the term "offgases" is to be understood as meaning any form of gas which on account of a content of toxic and/or environmentally harmful gas constituents is subject to a catalytic offgas purification. This especially also includes flue gases.

The catalyst is in particular an SCR catalyst for removal of nitrogen oxides (NOx) from the offgas. In one example the reactor therefore also comprises an apparatus for injection of ammonia, urea solution or another suitable compound for conversion of nitrogen oxides into nitrogen in the context of a comproportionation reaction.

The housing shaft is for example in the form of an offgas-permeable metal lattice or metal frame. In any case the housing shaft is configured such that it allows unhindered passage of offgases to the catalyst modules and has a guide frame-like structure, so that the catalyst units inside the housing shaft are upwardly and downwardly movable in the case of vertically installed catalyst units for example. This makes the catalyst unit withdrawable from the housing shaft and reusable.

The first movable covering element is arranged in the region of the housing opening of the reactor and in the closed state, i.e. in the case of a closed covering element, covers the housing opening. In the closed state of the first covering element no air exchange between the reactor or the housing shaft and the catalyst unit present therein and the sealing housing and an external environment is possible. The first covering element is in one example in the form of a flap or door and comprises a hinge joint or another mechanism for opening and closing.

The second movable covering element is arranged in the region of the second opening of the sealing housing. It covers the second opening of the sealing housing in the closed state of the second covering element. In the closed state of the second covering element no air exchange between an external environment and the sealing housing and/or the housing shaft and the catalyst unit present therein is possible. If the first covering element is open air exchange between the sealing housing and the housing shaft is possible. If the first covering element and the second covering element are closed the sealing housing is sealed both from the external environment and from the housing shaft, i.e. no air exchange between the sealing housing and the external environment and the housing shaft occurs. The second covering element is in one example in the form of a flap or door and comprises a hinge joint or another suitable mechanism for opening and closing. In a further example the second covering element is configured as a superposed plate which for stabilization is positively connected to a wall of the sealing housing.

One embodiment of the reactor is characterized in that the sealing elements are arranged such that they seal the housing shaft from the environment, in particular an external environment of the reactor, by contact with the catalyst unit, thus preventing air exchange between an external environment of the reactor and an interior of the housing shaft. The sealing elements are thus arranged such that they seal the housing shaft from the environment through contact with a catalyst module and/or the extension module. In particular, the sealing elements are arranged such that they seal the housing shaft from the external environment in the case of an open first and second covering element independently of the position of the catalyst module inside the housing shaft.

The first and second sealing element, i.e. the sealing elements, are arranged such that any movement of the catalyst unit inside the housing shaft results in areal contact between the respective sealing element and the catalyst unit. The areal contact between a sealing element and the catalyst unit exists between the respective sealing element or the sealing elements and/or a catalyst module or extension module of the catalyst unit. The areal contact prevents air exchange between an interior of the housing shaft, and thus an interior of the reactor, and an external environment of the reactor.

Depending on mechanical configuration the first and the second sealing element may also be in the form of a single seal, wherein this single seal then comprises the first and the second sealing element. This may be for example a single cylindrical seal which comprises a thickening in a first region and a second region, wherein the thickening brings about the areal contact with the catalyst unit.

One embodiment of the reactor is characterized in that in the case of a catalyst unit fully inserted in the reactor
  the first covering element is open and
  the second covering element is closed.

In the case of a catalyst unit fully inserted in the reactor or housing shaft the first covering element is open since it is in the region of the housing opening through which the extension element extends.

One embodiment of the reactor is characterized in that the first sealing element is arranged such that in contact with the catalyst unit it seals the housing shaft from the environment in the case of an open second covering element.

The first sealing element is arranged such that in the case of a catalyst unit fully inserted in the reactor there is contact between the catalyst unit and the first sealing element, thus ensuring that the housing shaft is sealed from the external environment. In the case of a catalyst unit fully inserted in the reactor the contact here is between the first sealing element and the extension module. If the catalyst unit is moved out of the housing shaft for example through the housing opening the contact over the course of the motion is initially between the first sealing element and initially the extension module, subsequently between the first sealing element and the extension module and a catalyst module and subsequently between the first sealing element and a catalyst module.

One embodiment of the reactor is characterized in that in the case of a catalyst unit partially withdrawn from the housing shaft the first covering element and the second covering element are arranged such that
  the first covering element is open and
  the second covering element is open.

If the catalyst unit has been partially withdrawn from the housing shaft, for example to a quarter of the length of the catalyst unit, both the first covering element and the second covering element are open. There is now areal contact between the catalyst unit and the first sealing element or between the catalyst unit and the first and the second sealing element. This has the result that even in the case of an open first and second covering element no air exchange between the housing shaft and the external environment occurs.

One embodiment of the reactor is characterized in that in the case of a catalyst unit completely removed from the housing shaft and a catalyst unit partially arranged inside the sealing housing the first covering element and the second covering element are arranged such that
  the first covering element is open or closed and
  the second covering element is open.

The catalyst unit comprises a first and a second end. The catalyst unit is withdrawn from the housing shaft by its first end, with the result that the second end remains inside the housing shaft over most of the duration of the operation. Only towards the end of the withdrawing operation when the catalyst unit has been almost completely removed is the second end of the catalyst unit inside the sealing housing. In this phase the housing shaft is sealed from the external environment at least via areal contact between the catalyst unit and the second sealing element. In this state the second covering element is open. The first covering element may be open or closed. It is closed before there is no longer any contact between the catalyst unit and the second sealing element to prevent air exchange between an external environment of the reactor and the housing shaft.

One embodiment of the reactor is therefore characterized in that in the case of a catalyst unit completely removed from the housing shaft and a catalyst unit partially arranged inside the sealing housing the first sealing element and the second sealing element are arranged such that
  in contact with the catalyst unit the second sealing element seals the housing shaft from the environment.

One embodiment of the reactor is further characterized in that in the case of a catalyst unit completely withdrawn from the housing shaft and from the sealing housing
  the first covering element is closed and
  optionally the second covering element is closed.

If the catalyst unit has been withdrawn from the housing shaft to such an extent that the only remaining contact is between the catalyst unit and the second sealing element the first covering element is closed to ensure that the reactor as a whole is closed via the covered housing opening. In a next step the catalyst unit is completely withdrawn from the sealing housing in order subsequently to be replaced with a new catalyst unit. In this phase the second covering element may remain open or be closed.

The considerations for the abovementioned embodiments also apply correspondingly to the opposite case, i.e. to transitory states during insertion of a catalyst unit into the reactor according to the invention.

The objects of the invention are further at least partially achieved by a
  process for withdrawing a catalyst unit from a reactor,
  in particular a reactor for purifying offgases, wherein
  the reactor has a housing opening which opens into a
    housing shaft and
  a catalyst unit arranged inside the housing shaft, wherein
    the catalyst unit comprises one or more catalyst modules and wherein the reactor comprises a sealing housing, wherein the sealing housing encases the housing opening and comprises a first and second movable covering element and a first and second sealing element, and an extension module connected to a catalyst module is arranged at a first end of the catalyst unit and in the case of a catalyst unit inserted into the housing shaft extends through the housing opening and at least partially through the sealing housing, wherein the process comprises the steps of:

providing the reactor with a catalyst unit fully inserted in the housing shaft, an open first covering element and a closed second covering element;

opening the second covering element of the sealing housing to make the catalyst unit externally accessible and to seal the housing shaft from the environment via the first sealing element in contact with the catalyst unit;

first withdrawing of the catalyst unit from the housing shaft by a first end of the catalyst unit, wherein during the first withdrawing the housing shaft is sealed from the environment via the first and second sealing element in contact with the catalyst unit;

second withdrawing of the catalyst unit from the housing shaft until a second end of the catalyst unit is inside the sealing housing, wherein during the second withdrawing the housing shaft is sealed from the environment via the second sealing element in contact with the catalyst unit;

closing the first covering element to seal the housing shaft from the environment via the closed first covering element.

It is preferable when the abovementioned process steps are performed in the specified sequence.

The process according to the invention is in particular intended for withdrawing a catalyst unit from the reactor according to the invention in the course of ongoing operation. In particular the process according to the invention is intended for withdrawing a spent catalyst unit from the reactor according to the invention in the course of ongoing operation.

In particular as the initial process step the reactor is initially provided with a catalyst unit fully inserted into the housing shaft. The catalyst unit comprises spent or virtually spent catalyst modules. At this juncture in the process the first covering element is open since the extension module extends through the housing opening of the reactor into the sealing housing. The second covering element is closed to prevent air exchange between the housing shaft and an external environment of the reactor.

In a further, in particular subsequent, process step the second covering element of the sealing housing is opened. Since the first covering element is also open the catalyst unit is externally accessible. Air exchange is not possible despite both open covering elements since the first sealing element seals the housing shaft from the external environment through areal contact with the catalyst unit.

In a further, in particular subsequent, process step the catalyst unit is partially withdrawn from the housing shaft by its first end in a first withdrawing step. During this step the housing shaft is sealed from the external environment by areal contact between the catalyst unit and initially the first sealing element and subsequently the first and second sealing element.

In a further, in particular subsequent, process step the catalyst unit is further withdrawn from the housing shaft until only areal contact between the second sealing element and the catalyst unit in the region of its second end remains. At this juncture the first covering element may still be open since the second sealing element seals the housing shaft from the external environment.

In a further, in particular subsequent, process step the first covering element is closed. The housing shaft is therefore sealed from the external environment by the closed first covering element.

In one embodiment of the process the catalyst unit is completely removed from the reactor in a further process step. It may subsequently be replaced by a new catalyst unit comprising fresh catalyst which is subsequently reinserted into the reactor. Since in practically all cases relevant to large industrial scale operation the reactor will comprise a multiplicity of catalyst units, operation may also be continued in the case of a temporarily removed catalyst unit without any danger of exceeding offgas limits prescribed by law during the replacement.

One embodiment of the process is characterized in that the withdrawing of the catalyst unit, in particular the first and second withdrawing of the catalyst unit, is carried out by securing a withdrawal apparatus to the extension module.

The extension module may comprise a securing apparatus which allows securing of a withdrawing apparatus. The withdrawing apparatus may be a crane for example when the catalyst module is withdrawn from the reactor from above.

In one embodiment the sealing housing comprises the first and second movable covering element and the first and second sealing element.

The objects of the invention are further at least partially solved by a process for inserting a catalyst unit into a reactor, in particular a reactor for purifying offgases, wherein the reactor has a housing opening which opens into a housing shaft and a catalyst unit arranged inside the housing shaft, wherein the catalyst unit comprises one or more catalyst modules and wherein the reactor comprises a sealing housing, wherein the sealing housing encases the housing opening and comprises a first and second movable covering element and a first and second sealing element, and an extension module connected to a catalyst module is arranged at a first end of the catalyst unit and extends through the housing opening and at least partially through the sealing housing, wherein the process comprises the steps of:

providing the reactor with an empty housing shaft, a closed first covering element and an open second covering element;

first inserting of the catalyst unit by a second end of the catalyst unit into the sealing housing, wherein the housing shaft is sealed from the environment via the second sealing element n contact with the catalyst unit;

opening the first covering element to make the housing shaft accessible to the catalyst unit;

second inserting of the catalyst unit into the housing shaft until the catalyst unit is fully inserted into the housing shaft, wherein during the second inserting the housing shaft is sealed from the environment initially via the first and second sealing element and subsequently the first sealing element in contact with the catalyst unit;

closing the second covering element.

The process according to the invention is in particular intended for inserting a catalyst unit into the reactor according to the invention in the course of ongoing operation. In particular the process according to the invention is intended for inserting a spent catalyst unit into the reactor according to the invention in the course of ongoing operation.

In particular as the initial process step the reactor is initially provided with an empty housing shaft, a closed first covering element and an open second covering element. At this juncture in the process the first covering element is closed to seal the empty housing shaft from the external environment of the reactor. The second covering element is open in order that the catalyst unit to be replaced may be moved by its second end through the sealing housing in the direction of the housing shaft.

In a further, in particular subsequent, process step the catalyst unit is in a first inserting step moved by its second end in the direction of the housing shaft, thus sealing the housing shaft from the environment via the second sealing element in contact with the catalyst unit.

This allows the first covering element to be opened in a further, in particular subsequent, process step without there being any air exchange between the housing shaft and an external environment of the reactor. This makes the catalyst unit accessible to the housing shaft.

In a further, in particular subsequent, process step the catalyst unit is in a second inserting step inserted into the housing shaft until the catalyst unit is fully inserted into the housing shaft. In the course of this second inserting step the reactor shaft is sealed from the external environment of the reactor initially by the first and second sealing element and subsequently, as soon as the first end of the catalyst unit is no longer at the height of the second opening of the sealing housing, only by the first sealing element.

In a further, in particular subsequent, and more preferably final process step the second covering element is closed. The inserting of the catalyst unit is thus complete.

One embodiment of the process according to the invention is characterized in that the inserting of the catalyst unit, in particular the first and second inserting of the catalyst unit, is carried out by securing an insertion apparatus to the extension module.

The extension module may comprise a securing apparatus which allows securing of a withdrawing apparatus. The withdrawing apparatus may be a crane for example when the catalyst module is withdrawn from the reactor from above.

The objects of the invention are further at least partially solved by a process for replacing a spent catalyst unit of a reactor, in particular a reactor for purifying offgases, comprising the process steps of the abovementioned process for withdrawing a catalyst unit from a reactor according to the invention and the process steps of the abovementioned process for inserting a catalyst unit into a reactor according to the invention. The replacement is preferably carried out in the course of ongoing operation of the reactor.

BRIEF DESCRIPTION OF THE DRAWINGS

The invention is explained in more detail below by an exemplary embodiment. In the following detailed description reference is made to the accompanying drawings which form a part of the exemplary embodiment and which contains an illustrative representation of a specific embodiment of the invention. In this connection, direction-specific terminology such as "top", "bottom", "front", "back", etc., is used with reference to the orientation of the described figure. Since components of embodiments may be positioned in a multiplicity of orientations, the direction-specific terminology is used for elucidation and is in no way limiting. A person skilled in the art will appreciate that other embodiments may be used and structural or logical changes may be undertaken without departing from the scope of protection of the invention. The following detailed description is therefore not to be understood in a limiting sense, and the scope of protection of the embodiments is defined by the accompanying claims. Unless otherwise stated, the drawings are not true to scale.

FIG. 2 shows an embodiment of an inventive process for withdrawing a catalyst unit from a reactor and FIG. 3 shows an embodiment of an inventive process for inserting a catalyst unit into a reactor.

DETAILED DESCRIPTION OF PREFERRED EMBODIMENTS

Figure 1:
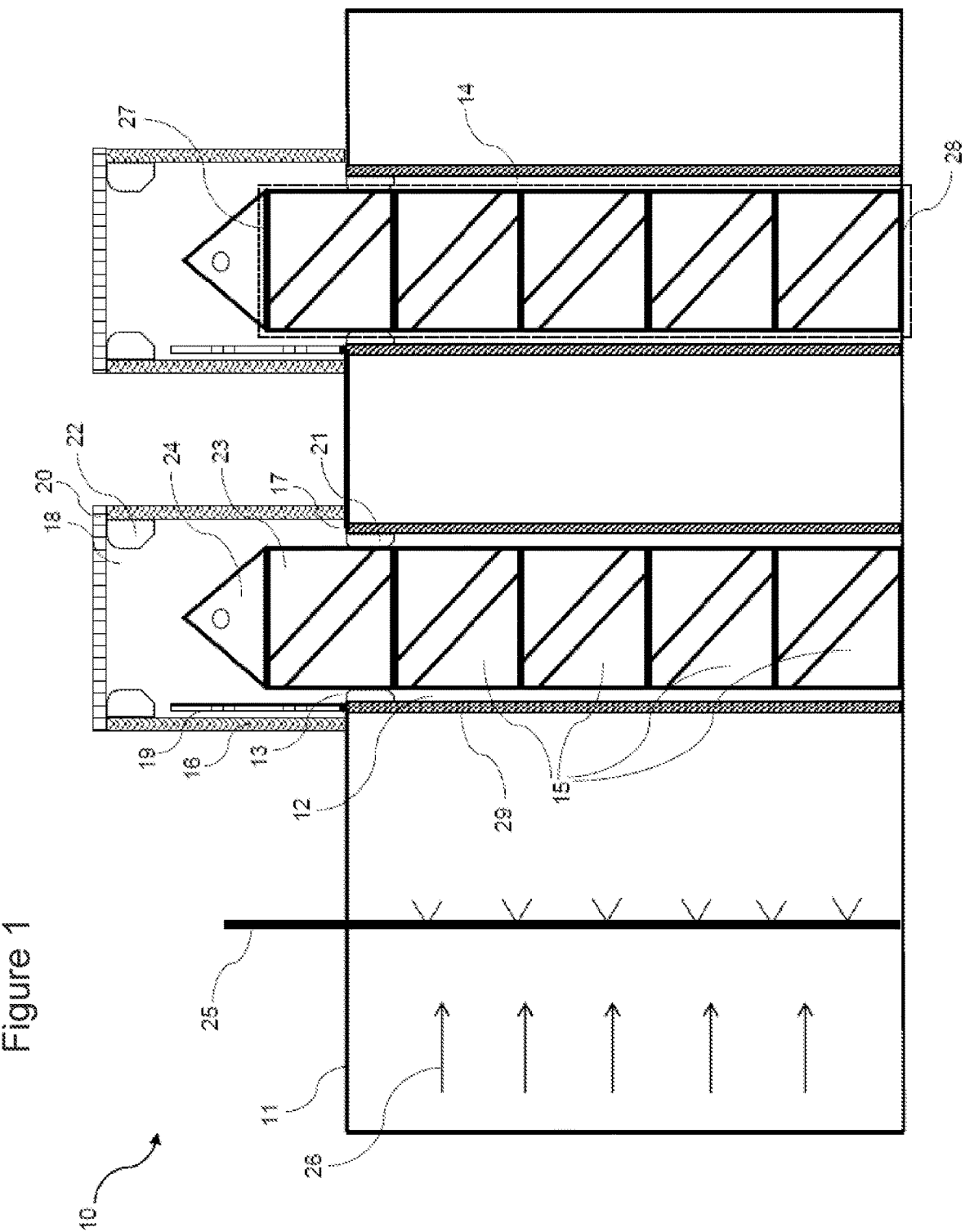
FIG. 1 shows an embodiment of an inventive reactor.
Figure 2:
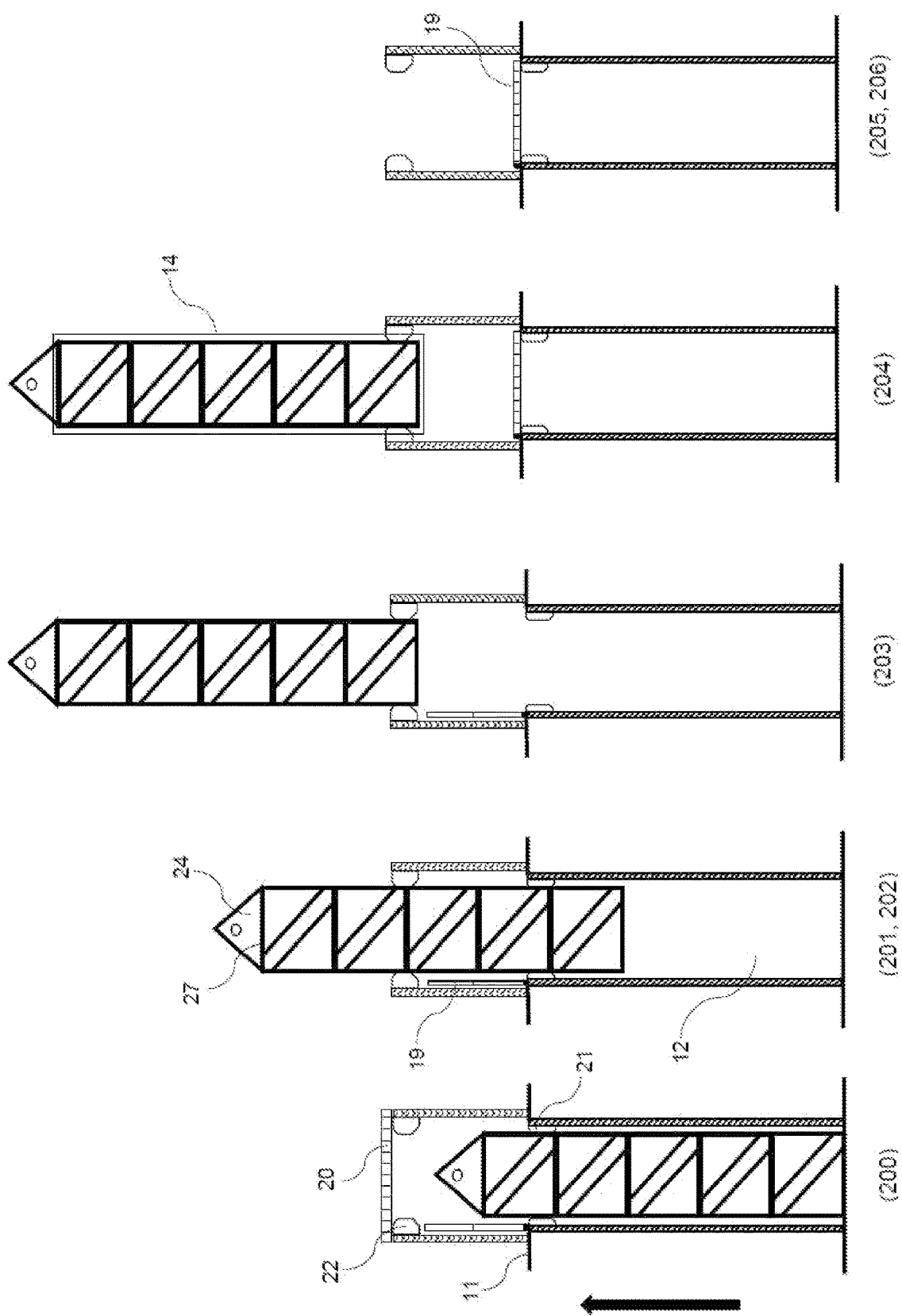

In FIGS. 1 to 3 identical elements are each provided with identical reference numerals.

FIG. 1 shows an embodiment of an inventive reactor for purification of offgases, here for removal of nitrogen oxides (NOx) from the flue gases of a reformer furnace. The flue gases are formed during firing of the reactor tubes vertically arranged in the reformer furnace in which the formation of synthesis gas from natural gas and steam is carried out. The firing typically employs burners which radiate from top to bottom or from bottom to top and whose flue gases comprise an intolerable content of nitrogen oxides.

The reactor 10 as shown in FIG. 1 is in ongoing operation with inserted catalyst units.

An offgas stream 26 in the form of NOx-containing flue gases enters a reactor 10 from the left. Reactor 10 is part of a larger plant complex for production of synthesis gas but is here shown as an isolated reactor 10 for reasons of clarity. The reactor 10 comprises a housing 11. Before the offgas stream 26 is supplied to the actual offgas treatment said stream is mixed with an auxiliary by means of an auxiliary injection 25. In the example of FIG. 1 the auxiliary is ammonia. In the downstream catalyst units 14 ammonia and NOx are selectively converted into nitrogen.

The reactor 10 further comprises a multiplicity of catalyst units 14. For reasons of clarity, only two of these catalyst units 14 are shown in FIG. 1. The offgas stream 26, mixed with ammonia, flows through these catalyst units 14 from left to right. A purified offgas stream exits the reactor 10 on the right-hand side.

The catalyst units 14 comprise a first, in this case upper, end 27 and a second, in this case lower, end 28. The catalyst units 14 each further comprise four catalyst modules 15 and an extension module 23 which is in each case secured at the uppermost of the four catalyst modules. Secured to each of the extension modules 23 is a securing apparatus 24, to which a withdrawal apparatus and/or an insertion apparatus such as for example a crane may be secured. Each of the catalyst units 14 is inserted in a housing shaft 12, inside which the catalyst unit 14 may be moved back and forth, in this case up and down. The extension module 23 extends through a housing opening 13 which opens into the housing shaft 12 below the housing opening 13. The housing shaft 12 is delimited by a gas-permeable metal frame 29 which secures the catalyst unit 14. The metal frame 29 may be in the form of a metal lattice for example.

The extension module 23 further extends through a sealing housing 16 which encases the housing opening 13. The sealing housing comprises at its lower side a first opening 17 which includes the housing opening 13, i.e. the area of the first opening 17 includes the area of the housing opening 13. The sealing housing 16 further comprises a second opening 18 at its upper side. In the region of the first opening 17 a first sealing element 21 is arranged. The first sealing element 21 is in areal contact with the extension module 23 of the catalyst unit 14. In the example of FIG. 1 it is secured to the metal frame 29. The metal frame 29 is in practice configured such that it secures the catalyst unit 14 below the sealing element (not shown). If the catalyst unit 14 is moved upwards areal contact between the catalyst unit 14 and the first sealing element 21 endures, namely between the extension module 23 and the first sealing element, between the extension module 23 and a catalyst module 15 and the first sealing element or between a catalyst module 15 and the first sealing element 21.

A first movable covering element 19 is further arranged in the region of the housing opening 13 and the first opening 17 of the sealing housing. The first covering element 19 comprises a hinge joint and can thus close the housing opening 13. This is possible when the catalyst unit 14 has been withdrawn from the housing shaft 12 to such an extent that a second end 28 of the catalyst unit is approximately at the height of a second sealing element 22. The second sealing element 22 is arranged in the region of the second opening 18 of the sealing housing. Also arranged in this region is a second movable covering element 20 which in the closed state, as shown, closes the second opening of the sealing housing. In the example of FIG. 1 the second covering element 20 is in the form of a covering plate. Through appropriate shaping the covering plate may be configured so as to form a secure positive connection to the sealing housing 16, for example to secure the covering plate from slipping out of place.

The first sealing element 21 and the second sealing element 22 are securely connected to the metal frame 29/the sealing housing 16. They are arranged such that when withdrawing the catalyst unit 14 from the housing shaft 12 there is always areal contact between at least one sealing element and the catalyst unit for as long as the first covering element cannot be closed.

The first sealing element 21 and the second sealing element 22 may also be in the form of a single seal which comprises appropriate sealing elements 21 and 22 capable of making areal contact with the catalyst unit.

FIG. 2 shows an embodiment of an inventive process for withdrawing a catalyst unit from a reactor, in particular the inventive reactor. In a first process step 200 the reactor 10 is provided with a fully inserted catalyst unit 14. The reactor 10 is in the course of ongoing operation, the first covering element 19 is open and the second covering element 20 is closed.

In a subsequent process step 201 the second covering element 19 is opened by lifting off the sealing housing 16. The catalyst module 14 is thus externally accessible and may be secured to the securing apparatus 24 by a crane as the withdrawal apparatus for example. The areal contact between the first sealing element 21 and the catalyst unit 14 ensures that no air exchange between an external environment of the reactor 10 and the housing shaft 12 occurs.

In a subsequent process step 202 the catalyst unit 14 is moved upwards by its first end 27. As shown, areal contact is maintained between the first sealing element 21 and the second sealing element 22 and the catalyst unit 14 during the upward motion, thus preventing air exchange between an external environment of the reactor and the housing shaft 12 during the upward motion.

In a subsequent process step 203 the catalyst unit 14 is withdrawn from the reactor shaft 12 to such an extent that a second end 28 of the catalyst unit 14 is inside the sealing housing 16 and an external environment of the reactor 10 is sealed from the housing shaft only via the second sealing element 22 in contact with the catalyst unit 14. In this step the catalyst unit 14 is withdrawn from the housing shaft 12 to such an extent that the first covering element 19 may be closed.

Accordingly, the second covering element 19 is closed in a subsequent process step 204, thus sealing the housing shaft 12 from the external environment via the closed first covering element 19. In a subsequent step 206 the spent catalyst module may be completely removed and replaced by a new catalyst module.

FIG. 3 shows an embodiment of an inventive process for inserting a catalyst unit into a reactor, in particular for inserting a catalyst unit into an inventive reactor. The catalyst unit to be inserted is preferably a new catalyst unit comprising unspent catalyst.

In a first process step 300 the reactor 10 is provided with an empty housing shaft 12. The first covering element 19 is closed to seal the housing shaft 12 from an external environment of the reactor 10.

In a subsequent process step 301 the catalyst unit 14 is inserted by its second end 28 into the sealing housing 16 to such an extent that the catalyst unit 14 seals the housing shaft 12 from an external environment of the reactor via areal contact with the second sealing element 22.

This contact with the second sealing element 22 allows the first covering element 19 to be opened in a subsequent process step 302. This makes the catalyst unit 14 accessible to the housing shaft 12.

In a further process step 303 the catalyst unit 14 is inserted further into the housing shaft until said unit is fully inserted in the housing shaft. Finally, the second covering element 20 is closed in a further process step 304 and the reactor is thus back in its standard operating state.

The process according to FIG. 2 is suitable especially in conjunction with the process according to FIG. 3 for replacing a spent catalyst unit with a new catalyst unit in the course of ongoing operation of a reactor, in particular a reactor for offgas treatment, in particular a reactor according to the invention.

LIST OF REFERENCE SYMBOLS

10 Reactor
11 Housing
12 Housing shaft
13 Housing opening
14 Catalyst unit
15 Catalyst module
16 Sealing housing
17 First opening of the sealing housing
18 Second opening of the sealing housing
19 First covering element
20 Second covering element
21 First sealing element
22 Second sealing element
23 Extension module
24 Securing apparatus
25 Auxiliary injection
26 Offgas stream
27 First end of a catalyst unit
28 Second end of a catalyst unit
29 Metal frame It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A reactor, comprising
a housing comprising at least one housing opening which opens into a housing shaft;

a catalyst unit arranged inside the housing shaft, movable inside the housing shaft and withdrawable from the housing shaft, wherein the catalyst unit comprises one or more catalyst modules;

a sealing housing encasing the housing opening having a first side and a second side, wherein the sealing housing comprises a first opening arranged in the region of the housing opening on the first side and a second opening arranged on the second side;

a first movable covering element arranged in the region of the housing opening and the first opening of the sealing housing which in the closed state covers the housing opening;

a second movable covering element arranged in the region of the second opening of the sealing housing which in the closed state covers the second opening of the sealing housing;

a first sealing element arranged in the region of the housing opening and the first opening of the sealing housing;

a second sealing element arranged in the region of the second opening of the sealing housing; and an extension module which is arranged at a first end of the catalyst unit and is connected to a catalyst module and extends through the housing opening and at least partially through the sealing housing.

2. The reactor according to claim 1, wherein the sealing elements are arranged such that they seal the housing shaft from the environment by contact with the catalyst unit, thus preventing air exchange between an external environment of the reactor (10) and an interior of the housing shaft.

3. The reactor according claim 1, wherein in the case of a catalyst unit fully inserted in the reactor
the first covering element is open and
the second covering element is closed.

4. The reactor according to claim 1, wherein the first sealing element is arranged such that in contact with the catalyst unit the housing shaft seals from the environment in the case of an open second covering element.

5. The reactor according to claim 1, wherein in the case of a catalyst unit partially withdrawn from the housing shaft the first covering element and the second covering element are arranged such that
the first covering element is open and
the second covering element is open.

6. The reactor according to claim 1, wherein in the case of a catalyst unit completely removed from the housing shaft and a catalyst unit partially arranged inside the sealing housing the first covering element and the second covering element are arranged such that
the first covering element is open or closed and
the second covering element is open.

7. The reactor according to claim 1, wherein in the case of a catalyst unit completely removed from the housing shaft and a catalyst unit partially arranged inside the sealing housing the first sealing element and the second sealing element are arranged such that
in contact with the catalyst unit the second sealing element seals the housing shaft from the environment.

8. The reactor according to claim 1, wherein in the case of a catalyst unit) completely withdrawn from the housing shaft and from the sealing housing
the first covering element is closed and
optionally the second covering element is closed.

9. The reactor according to claim 1, wherein a first catalyst unit in the flow direction of the offgas stream has a shorter flow path length than a subsequent catalyst unit in the flow direction of the offgas stream.

10. A process for withdrawing a catalyst unit from a reactor,
wherein
the reactor has a housing opening which opens into a housing shaft and
a catalyst unit arranged inside the housing shaft, wherein the catalyst unit comprises one or more catalyst modules and wherein the reactor comprises a sealing housing, wherein the sealing housing encases the housing opening and comprises a first and second movable covering element and a first and second sealing element, and
an extension module connected to a catalyst module is arranged at a first end of the catalyst unit and in the case of a catalyst unit inserted into the housing shaft extends through the housing opening and at least partially through the sealing housing, wherein
the process comprises the steps of:
providing the reactor with a catalyst unit fully inserted in the housing shaft, an open first covering element and a closed second covering element;
opening the second covering element of the sealing housing to make the catalyst unit externally accessible and to seal the housing shaft from the environment via the first sealing element in contact with the catalyst unit;
first withdrawing of the catalyst unit from the housing shaft by a first end of the catalyst unit, wherein during the first withdrawing the housing shaft is sealed from the environment via the first and second sealing element in contact with the catalyst unit;
second withdrawing of the catalyst unit from the housing shaft until a second end of the catalyst unit is inside the sealing housing, wherein during the second withdrawing the housing shaft is sealed from the environment via the second sealing element in contact with the catalyst unit; and
closing the first covering element to seal the housing shaft from the environment via the closed first covering element.

11. A process for inserting a catalyst unit into a reactor, wherein
the reactor has a housing opening which opens into a housing shaft and a catalyst unit arranged inside the housing shaft, wherein the catalyst unit comprises one or more catalyst modules and wherein the reactor comprises a sealing housing, wherein the sealing housing encases the housing opening and comprises a first and second movable covering element and a first and second sealing element, and an extension module connected to a catalyst module is arranged at a first end of the catalyst unit and extends through the housing opening and at least partially through the sealing housing, wherein
the process comprises the steps of:
providing the reactor with an empty housing shaft, a closed first covering element and an open second covering element;
first inserting of the catalyst unit by a second end of the catalyst unit into the sealing housing, wherein the housing shaft is sealed from the environment via the second sealing element in contact with the catalyst unit;

opening the first covering element to make the housing shaft accessible to the catalyst unit;

second inserting of the catalyst unit into the housing shaft until the catalyst unit is fully inserted into the housing shaft, wherein during the second inserting the housing shaft is sealed from the environment initially via the first and second sealing element and subsequently the first sealing element in contact with the catalyst unit; and closing the second covering element.

* * * * *